L. ILLMER, Jr. & E. J. KUNZE.
INTERNAL COMBUSTION ENGINE.
APPLICATION FILED AUG. 29, 1912.
1,054,205.
Patented Feb. 25, 1913.
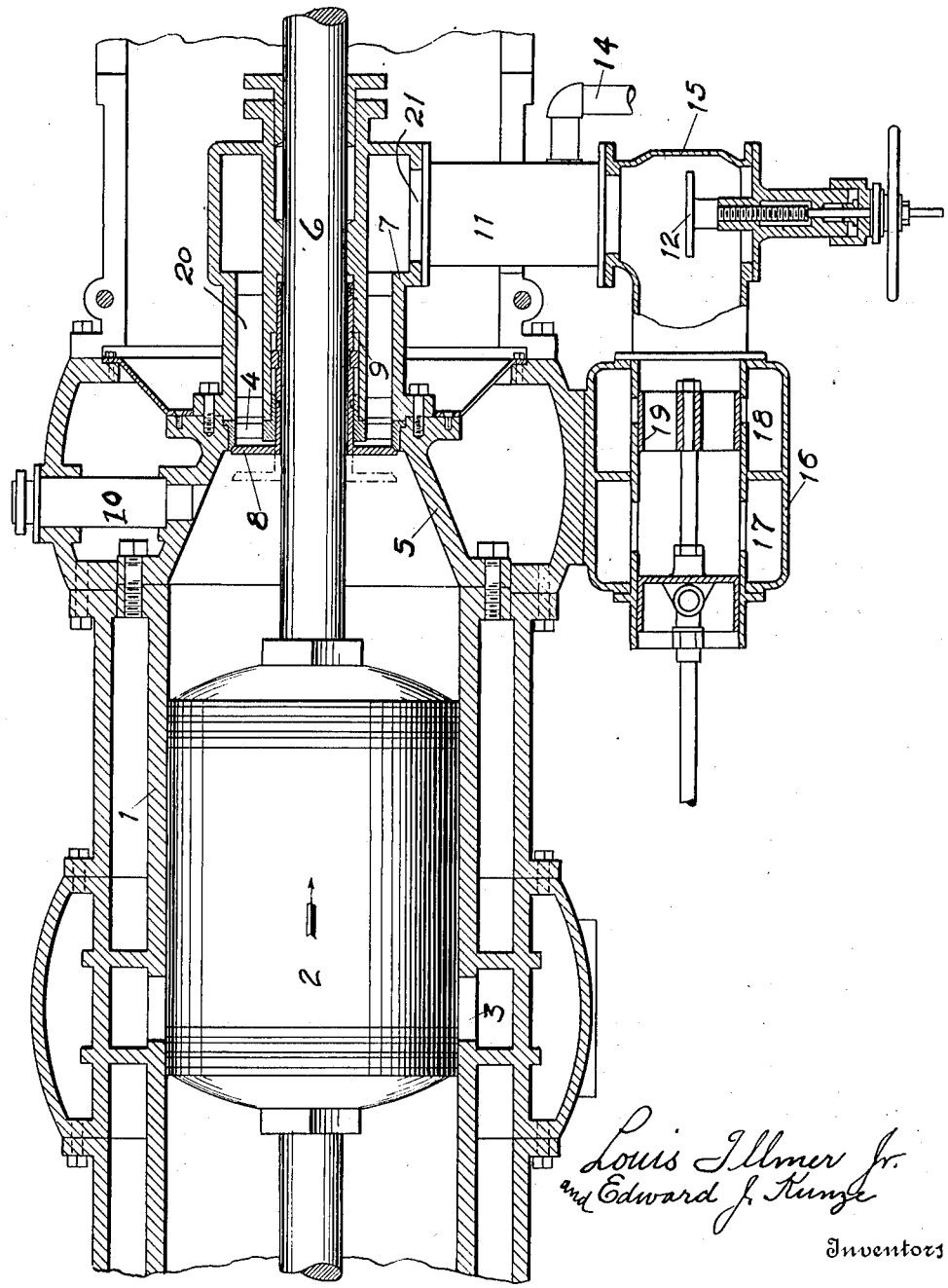

UNITED STATES PATENT OFFICE.

LOUIS ILLMER, JR., OF READING, PENNSYLVANIA, AND EDWARD J. KUNZE, OF EAST LANSING, MICHIGAN, ASSIGNORS TO ILLMER GAS ENGINE COMPANY, A CORPORATION OF DELAWARE.

INTERNAL-COMBUSTION ENGINE.

1,054,205.      Specification of Letters Patent.      Patented Feb. 25, 1913.

Original application filed February 4, 1904, Serial No. 191,968. Renewed April 12, 1912, Serial No. 690,314. Divided and this application filed August 29, 1912. Serial No. 717,703.

*To all whom it may concern:*

Be it known that we, LOUIS ILLMER, Jr., and EDWARD J. KUNZE, citizens of the United States, residing, respectively, in the city of Reading, county of Berks, and State of Pennsylvania, and in the city of East Lansing, county of Ingham, and the State of Michigan, have invented some new and useful Improvements in Internal-Combustion Engines, of which the following is a specification.

The present application is a division of the application for patent Serial No. 191,968 filed by us Feb. 4, 1904, and renewed April 12, 1912, Serial No. 690,314, which application is concerned principally with the cylinder head and valve mechanism, hence no detailed reference thereto will be made in this specification.

Our invention relates to a novel method for charging the power cylinder of an internal combustion engine and particularly to means controlling the movements and disposition of the air and gaseous fuel supplies, whereby to scavenge the power cylinder with a body of air after each explosion. The control means designed to bring about these functions serves to form and send forward alternate bodies of scavening air and of explosive mixture through a conduit or other suitable means of communication discharging to the inlet port of the power cylinder. These operations are timed in synchronism with the inlet valve movements and so controlled that upon opening of the inlet and the exhaust ports, a body of scavenging air is blown into the cylinder to cool and cleanse the same, followed by a mixture body which takes its place as a working charge, and this in turn followed by a second body of air, which last named air blows the preceding mixture body out of said conduit and fully enters the same into the power cylinder. A minor portion of said second body of air is allowed to follow the mixture body into the cylinder, while the major portion of said air body is held back of the inlet valve during the entire period of inlet closure so as to form part of the scavenging air for the next succeeding mixture body. The power cylinder is thus scavenged with a body of air after each explosion and at the end of each charging period of the cylinder, air alone will fill the conduit and isolate the combustion chamber from the gas supply. To complete the cycle of operations, the mixture-body within the power cylinder is compressed, ignited, expanded and finally exhausted in essentially the usual manner of explosive engines.

The principles underlying the present invention are particularly applicable to internal combustion engines of the two stroke type, and we shall describe in specific terms the structure of a mechanism applied to such an engine, such specific construction is however subject to various modifications without departing from the spirit and intent of the present invention.

Reference is had to the accompanying drawing which represents a longitudinal section of that part of the engine mainly concerned with out invention.

In said drawing, 1 represents a portion of a double acting power cylinder provided with exhaust ports 3 located intermediate the end of the cylinder bore and adapted to be overrun by the double acting piston 2, as is customary in engines of the two stroke type. The piston rod 6 connects with the main crosshead of the engine and the piston is reciprocated by means of a crank mechanism in the usual manner (not shown). The cylinder 1 carries an attached cylinder head 5, consisting of a gyrate head wall positioned around the longitudinal axis of the cylinder and encircling the piston rod 6. The central opening into the outward or free end of the gyrate headwall constitutes the inlet port 4 into the power cylinder. Said inlet port is commanded by an inlet valve 8, which is provided with an integral system 9 slidably mounted in the valve housing 7.

The inlet valve is positively operated by a gear mechanism (not shown) which is more fully described in the parent application herinbefore referred to. The valve is under the control of an eccentric driven gear and so timed as to open and close for the charging period in unison with the piston movements. In the engine of the two stroke type described, the inlet valve is intended to open immediately after the exhaust pressure in the power cylinder has equalized with the atmospheric pressure and to close shortly after the closure of the exhaust valve.

The valve housing 7 consists of an outer tubular wall which is attached to the gyrate head wall and an inner tubular wall through which the piston rod 6 passes. The said inner and outer walls are concentric and are spaced from each other to form an annular feed passage 20 which leads from the lateral opening 21 to the inlet port 4 of the power cylinder.

Extending laterally from the valve housing and discharging into the opening 21 thereof, is a duct 11. An elbow 15 or other suitable connection extends between the receiving end of the duct 11 and the control device 16, thus completing the conduit or means of communication from the control device 16 to the inlet port 4 of the power cylinder. This conduit may be fitted with a stop valve 12 to be used with an air starting attachment, of which 14 may be taken to be the supply pipe, although these auxiliaries form no part of the present invention.

The control device 16 is provided with an air supply chamber 17 and a gas supply chamber 18, the latter being controlled by the valve 19. This valve is reciprocated in synchronism with the piston movements by means of an eccentric drive (not shown). In the preferred construction the travel of the fuel control valve 19 is made variable by the action of a suitable governor control means, such for instance as is illustrated in the parent patent application previously referred to, in which the fuel control valve is made to close earlier at light loads so as to admit a smaller amount of fuel per stroke to the engine.

The air and gas supplies leading respectively to the chambers 17 and 18, are separately compressed by any fit means to give mobility to these fluids through the various passages leading into and through the power cylinder. Such initial compression may preferably be accomplished by the system of centralized pumping units as set forth in our co-pending application for patent Serial No. 223,878 filed Sept. 9, 1904. The cylinder charging may also be effected inversely by the action of suction influence exerted through the exhaust ports 3, whereby the air and gas supplies may be given the required difference of pressure to cause them to flow into the power cylinder in their characteristic alternate formation of air and a mixture of air and gas as hereinafter set forth.

The arrangement and operation of the control device 16 is such that the fuel control valve 19 may move to open the air supply only to the duct 11 or to open simultaneously both the air and gas supplies to said duct. These conditions take place alternately under the reciprocation of the fuel control valve 19, which movements are, however, modified from time to time by suitable governor control.

The mode of charging the power cylinder may be traced as follows:—The air and gaseous fuel supplies being under a relatively low pressure with respect to the pressure existing in the power cylinder during the charging period, results in sending from the control device 16, first a body of air and then a body of mixture of air and gaseous fuel in explosive proportions and so on in alternations, these bodies being sent forward in such alternate relations through the conduit connection communicating with the inlet port. It is intended that the said conduit and the valve parts be so designed as to best facilitate the forward movement of the alternate bodies of scavenging air and explosive mixture through the conduit without excessive eddying or intermingling so as to maintain the characteristic alternate formation within the power cylinder sufficiently close for commercial operation of the engine.

The above described charging operations are so timed that upon opening of the exhaust port 3 and the inlet port 4, a body of air will at this instant be lying in said conduit communication immediately behind the inlet valve, which body of air (hereinafter termed scavenging air) will thereupon flow into the power cylinder to cleanse and cool the same. Reference to the drawing will show that the parts are represented with the piston moving on compression, the inlet valve closed and the control device 16 open to air alone. The scavenging body is therefore maintained behind the inlet valve and extends back within the conduit to the fuel control valve 19.

Prior to the opening of the inlet valve, the fuel control valve will have opened the fuel port and consequently the opening of the inlet valve will time the forward flow into the power cylinder. At the instant of inlet opening, the control device 16 is therefore in position to form and send forth a mixture body of air and gaseous fuel in explosive proportions, which body immediately follows the scavenging air body. Such mixture body continuing to flow from the control device 16, blows forward the preceding scavenging air body until the said air body has been expelled from the conduit communication and fully entered into the power cylinder. Thereupon the mixture body itself begins to enter the power cylinder and after a sufficient quantity of mixture body has been allowed to form, the fuel control valve 19 closes the fuel port and thereafter air alone is discharged from the control device 16. Thus a succeeding body of air (hereinafter termed second body of air) in turn blows the latter portion of the preceding mixture body forward and out of the conduit passages 15, 11, and 20 and past the still open inlet valve until the entire mixture body has been made to enter the power cylinder. Only a minor portion of the said second body of air is allowed to follow the mixture body into the power cylinder, its flow being arrested by the timely closure of the exhaust and inlet valves of the power cylinder. At this instant, the major portion of the second body of air will fill the conduit and extend back to the control device 16 and be held in this position during the entire period of inlet closure.

The device 16 is essentially a control for the air and gaseous fuel supplies and by and through its agency the described alternate air and mixture bodies are formed and sent forward through the said conduit to the inlet port, so that the characteristic power cylinder charging operations may take place. In this manner, the mixture body is made to take its place within the power cylinder as a working charge, the intention being that the mixture body shall not in any case be larger than the effective cylinder volume and that the said second air body is to be so timed and controlled by the closure of the inlet valve or otherwise, that only a limited portion of the last named air body is allowed to follow the mixture body into the power cylinder and thus avoid blowing the mixture body out of the exhaust ports.

In the specific construction shown in the drawing, the fuel control valve 19 is not intended to reopen until after the inlet valve has closed. The timing of the inlet and exhaust closure therefore determine the amount or portion of the second body of air that is permitted to follow the mixture body into the power cylinder for a given relation between the pressure of the supplies and the engine speed. At the end of the charging period, which coincides approximately with the instant of inlet closure, the passages immediately back of the inlet valve and the conduit made up of the passages 20, 11 and 15 leading to the control device 16, will be filled with air alone. Prior to the reopening of the inlet valve, the fuel control valve 19 will again have opened the gas chamber 18, so that when the inlet valve again opens, the supplies are ready to begin recharging the power cylinder in the characteristic manner set forth. Air is held within the said conduit communication during the entire period of inlet closure and maintained back of the inlet valve so as to be in a position to pass into the power cylinder as a body of scavenging air for the next succeeding mixture body immediately upon reopening of the inlet valve. The said conduit being filled with air from the very instant of complete entry of the mixture body into the power cylinder, further serves to isolate the burning mixture charge from the gas supply.

The locating of the control device 16 remote from but communicating with the inlet port 4, constitutes an important feature of the present invention. By means of the conduit or means of communication connecting the control device 16 with the inlet port, the desired volume of scavenging air may be measured and limited at all engine speeds to the predetermined volumetric capacity of said conduit communication. In the preferred construction, the said conduit should have a volumetric capacity equal approximately to the volume or size of one of the scavenging air bodies that is to precede the mixture body into the power cylinder after each explosion, which scavenging air body is preferably made equal to approximately one half of the full load mixture body. Another advantage of the preferred construction resides in the separate valve gear drive of the fuel control valve 19 and the inlet valve 4. By this means the said valves may be timed independently of each other, and by leading the fuel control valve timing with respect to the inlet valve movements, wire drawing over the fuel ports in the gas chamber 18 may be avoided and thus a more uniform mixture body may be formed and the described alternate formation of the air and mixture bodies facilitated. The air and gas supplies are intended to be maintained at substantially equal pressures so that the air supply will not press back the gas supply when the gas port opens.

When the valve 19 of the control device 16 is reciprocated variably under the governor control, the gaseous fuel port will be closed earlier under light load conditions, thereby reducing the size of the mixture bodies formed during each stroke of the engine. In the construction of the control device shown in the drawing, this governor action results in an increase in the portion of the second air body that follows the mixture body into the cylinder. The essential feature and aim under all condition of load is to fully enter the mixture body into the cylinder before inlet closure and to have scavenging air alone lying back of the inlet valve and within the conduit communicating with the control device at the instant of inlet closure.

The engine is intended to be started in any suitable manner but preferably by means of compressed air in essentially the usual manner. During the starting period, the pressures of the air and the gas supplies leading to the control device 16 are to be suitably throttled or otherwise controlled to prevent blowing the mixture body out of the power cylinder when running at less than normal engine speed for which the control device is intended to be operated.

We claim:—

1. In an internal combustion engine of the scavenging type, the combination of a power cylinder having an inlet and an exhaust port; an inlet valve; separate supplies of air and gaseous fuel; a control means communicating with the inlet port for forming said supplies into mixture bodies, introducing bodies of air between such mixture bodies and sending such alternate bodies to the inlet port; the movement of said bodies being so timed that upon opening of the exhaust and inlet ports, a body of scavenging air is blown into the cylinder, then a mixture body and then a second body of air of which last named air a portion is held back of the inlet valve during the entire period of inlet closure.

2. In an internal combustion engine of the scavenging type, the combination of a power cylinder having an inlet and an exhaust port; an inlet valve; separate supplies of air and gaseous fuel under pressure; and means including a gaseous fuel control valve by which bodies of air and of explosive mixture are measured and sent forward alternately to the inlet port, the movement of said bodies being so timed that upon opening the inlet and the exhaust ports, a body of scavenging air is blown into the cylinder, then a mixture body and then a second body of air, of which last named air a portion is held back of the inlet valve during the entire period of inlet closure.

3. In an internal combustion engine of the scavenging type, the combination of a power cylinder having an inlet and an exhaust port; an inlet valve; separate supplies of air and gaseous fuel under pressure; and means including a gaseous fuel control valve by which bodies of air and of explosive mixture are measured and sent forward alternately to the inlet port; the movement of said bodies being so timed that upon opening the inlet and the exhaust ports, a body of scavenging air is blown into the cylinder, then a mixture body and then a second body of air, of which last named air a portion is held back of the inlet valve during the entire period of inlet closure; and means for opening the fuel control valve prior to the inlet valve.

4. In an internal combustion engine of the scavenging type, the combination of a power cylinder having an inlet and an exhaust port; an inlet valve; separate supplies of air and of gaseous fuel; a conduit discharging to the inlet port; control means for forming said supplies into measured mixture bodies, introducing bodies of air between such mixture bodies and sending such alternate bodies through said conduit to the inlet port, the movement of said bodies being so timed that upon opening the exhaust and inlet ports, a body of scavenging air is blown into the cylinder, then a mixture body, and then a second body of air, of which last named air a portion is held back of the inlet valve during the entire period of inlet closure.

5. In an internal combustion engine of the scavenging type, the combination of a power cylinder having an inlet and an exhaust port; an inlet valve; separate supplies of air and of gaseous fuel; a conduit discharging to the inlet port; control means remote from the inlet valve for forming said supplies into mixture bodies and separating such bodies by measured bodies of air and sending such alternate bodies through said conduit to the inlet port, the movement of said bodies being so timed that upon opening of the exhaust and inlet ports, a body of scavenging air will be blown into the cylinder, then a mixture body, and then a minor portion of a second body of air, the major portion of the last named air body being measured by and held within the said conduit during the entire period of inlet closure.

6. In an internal combustion engine of the scavenging type, the combination of a power cylinder having an inlet and an exhaust port; an inlet valve; separate supplies of air and of gaseous fuel; a conduit discharging to the inlet port; control means remote from the inlet valve for forming said supplies into measured mixture bodies and separating such bodies by bodies of air and sending such alternate bodies through said conduit to the inlet port, the movement of said bodies being so timed that upon opening of the exhaust and inlet ports, a body of scavenging air is blown into the cylinder, then a mixture body, and then a second body of air, which last named air blows the preceding mixture body out of said conduit and fully enters the mixture body into the power cylinder.

7. In an internal combustion engine of the scavenging type, the combination of a power cylinder having an inlet and an exhaust port; an inlet valve; control means operated independently of the inlet valve movements for forming the said supplies into measured mixture bodies, separating such bodies by measured bodies of air and sending such alternate bodies through said conduit to the inlet port; the movement of said bodies being so timed that upon opening of the exhaust and inlet ports, a body of scavenging air is blown into the cylinder, then a mixture body and then a second body of air, of which last named air a portion is held back of the inlet valve during the entire period of inlet closure.

In testimony whereof we affix our signatures in the presence of two witnesses.

LOUIS ILLMER, Jr.
EDWARD J. KUNZE.

Witnesses to the signature of Louis Illmer, Jr.:
CLARA E. YOUNG,
ED. A. KELLY.

Witnesses to the signature of Edward J. Kunze:
B. A. FAUNCE,
E. C. LINDEMANN.